(12) United States Patent
Hill

(10) Patent No.: US 7,669,371 B2
(45) Date of Patent: Mar. 2, 2010

(54) MODULAR UNDERFLOOR DISTRIBUTION SYSTEM

(75) Inventor: John William Hill, Little Hocking, OH (US)

(73) Assignee: The Wiremold Company, West Hartford, CT (US)

( * ) Notice: Subject to any disclaimer, the term of this patent is extended or adjusted under 35 U.S.C. 154(b) by 1534 days.

(21) Appl. No.: 10/736,820

(22) Filed: Dec. 15, 2003

(65) Prior Publication Data

US 2005/0126097 A1 Jun. 16, 2005

(51) Int. Cl.
*E04B 5/00* (2006.01)
(52) U.S. Cl. .............. 52/220.1; 52/220.2; 52/220.7; 52/220.8
(58) Field of Classification Search ............. 52/220.3, 52/220.5, 220.7, 263, 262; 174/95, 96, 482, 174/486, 489, 490; 439/211
See application file for complete search history.

(56) References Cited

U.S. PATENT DOCUMENTS

| | | | | |
|---|---|---|---|---|
| 1,986,965 A | * | 1/1935 | Frank .................. 174/72 C |
| 2,316,166 A | * | 4/1943 | Huguelet .............. 285/419 |
| 2,963,826 A | * | 12/1960 | Snider et al ............ 52/263 |
| 3,351,699 A | * | 11/1967 | Merckle ............... 174/371 |
| 3,405,834 A | * | 10/1968 | Butler et al. .......... 220/3.4 |
| 3,815,304 A | * | 6/1974 | Schille et al ........... 52/263 |
| 4,124,324 A | * | 11/1978 | Augis et al. ............ 404/3 |
| 5,257,487 A | * | 11/1993 | Bantz et al. .......... 52/220.1 |
| 5,285,009 A | * | 2/1994 | Bowman et al. ....... 174/482 |
| 5,362,922 A | * | 11/1994 | Whitehead ........... 174/480 |
| 5,467,609 A | * | 11/1995 | Feeney ............... 62/259.2 |
| 5,614,695 A | * | 3/1997 | Benito Navazo ....... 174/480 |
| 5,673,522 A | * | 10/1997 | Schilham ............. 52/263 |
| 5,675,950 A | * | 10/1997 | Schilham ............. 52/263 |
| 6,316,725 B1 | * | 11/2001 | Cole et al. ............ 174/486 |
| 6,329,591 B2 | * | 12/2001 | Karst et al. ........... 174/497 |
| 6,357,191 B1 | * | 3/2002 | Ault et al. ............ 52/336 |
| 6,637,165 B2 | * | 10/2003 | Jette ................. 52/220.1 |

* cited by examiner

*Primary Examiner*—Jeanette Chapman
(74) *Attorney, Agent, or Firm*—McAndrews, Held & Malloy, Ltd.

(57) ABSTRACT

An underfloor distribution system, includes a first module having a main body; an end closure and a cover. The end closure and the cover are removably mounted to the main body, and the first module is adapted to be removably mounted to a second module.

15 Claims, 4 Drawing Sheets

MODULAR UNDERFLOOR DISTRIBUTION SYSTEM

BACKGROUND OF THE INVENTION

Embodiments of the present invention generally relate to an underfloor distribution system, and more particular to a modular underfloor distribution system that may be positioned under a raised floor.

Modern office buildings require electric power, communication, and computer data services in various combinations at a large number of locations. In many instances, these needs are addressed by underfloor distribution systems including a network of ducts or raceways, housing power and communication cables, wiring, and the like, that are mounted in concrete floors. Another type of underfloor distribution system includes a series of ducts or raceways that are positioned between a base (such as a concrete floor) and a raised floor that is supported over the base through pedestals.

The amount of power, communication, data, etc., needed within a particular office space typically dictates the size and shape of the raceways and ducts. Thus, each network of raceways and ducts is typically separately manufactured and formed depending on the size and shape of network needed to accommodate particular amounts of cabling and wiring. Further, if the power and communications requirements in a particular space change, the network is also typically removed and replaced by a new network of raceways and ducts. In some cases, the old network remains in tact, but may be obsolete or inadequate to accommodate new infrastructure. Further, some old raceway and duct networks may take up too much underfloor space due to the fact that less wiring and cabling may be used with a new, less extensive, more efficient systems.

Thus, a need exists for a more efficient system and method of manufacturing and adapting an underfloor distribution system.

SUMMARY OF THE INVENTION

Embodiments of the present invention provide an underfloor distribution system, including a first module having a main body; an end closure and a cover. The end closure and the cover are removably mounted to the main body. That is, the end closure and the cover may be quickly and easily secured and removed to the main body, such as through the use of a screwdriver. The first module is adapted to be removably mounted to a second module.

The system includes additional modules removably secured to one another. That is, the plurality of modules may be quickly and easily secured to, and removed from, one another.

The underfloor distribution system may be secured to a concrete base that supports rows of pedestals that support a raised floor. The underfloor distribution system is positioned below the raised floor between at least two rows of the pedestals.

Embodiments of the present invention also provide a network of housings for an underfloor distribution system. The housings are configured to house at least one of power and communication wiring and cabling. The network includes a plurality of interchangeable modules, wherein each of the plurality of interchangeable modules includes a main body and an end closure and a cover removably secured to the main body. Each of the plurality of interchangeable modules are removably ganged to another of the plurality of interchangeable modules.

Embodiments of the present invention also provide a method of constructing ductwork for an underfloor distribution system, including manufacturing a plurality of sets of three basic components, forming a basic unit from one set of said three basic components; ganging a plurality of basic units together, and forming an underfloor distribution system through said ganging. The three basic components consist essentially of a main body, a cover assembly, and an end cover. The basic unit includes the three basic components removably connected to one another. The forming further comprises interchangeably connecting the plurality of basic units together to form a plurality of different configurations.

BRIEF DESCRIPTION OF SEVERAL VIEW OF THE DRAWINGS

Figure 1:
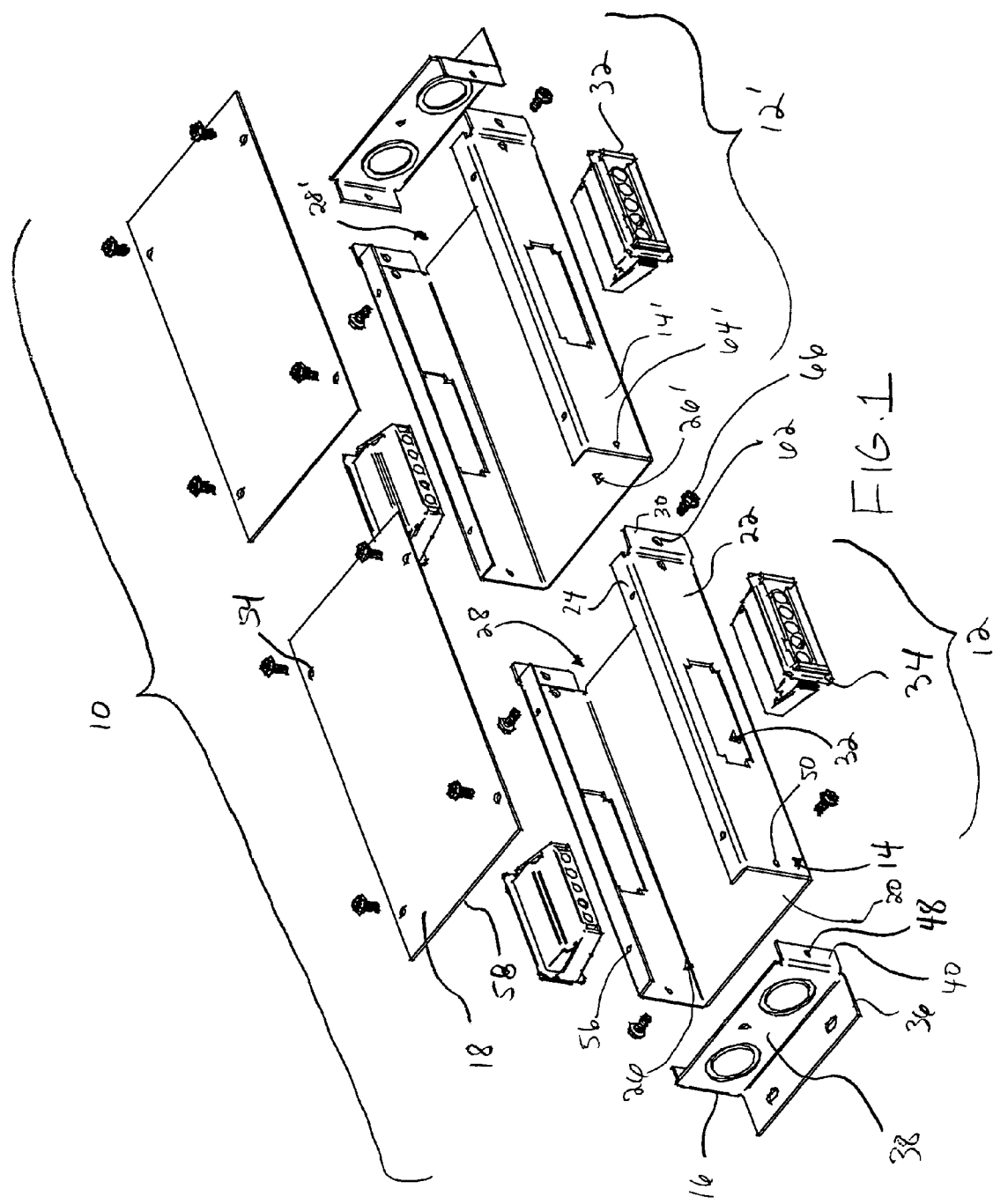
FIG. 1 illustrates an isometric exploded view of a modular distribution system according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an isometric exploded view of a modular distribution system 10 according to an embodiment of the present invention. The system 10 includes modules 12 and 12', which are configured to be removably secured to one another. As such, the modular distribution system 10 may include more modules 12 and 12'.

Each module 12 (and 12') includes a main body 14, an end closure 16, and a cover 18. The main body 14 includes a bottom wall 20 integrally formed with upstanding lateral walls 22, which are integrally connected to ledges 24, which are configured to support the cover 18. The ledges 24 are preferably oriented in a plane that is parallel to the bottom wall 20. The main body 14 also includes first and second open ends 26 and 28. Securing tabs 30 extend outwardly from the lateral walls 22 at the second open end 28. Optionally, securing tabs may extend outwardly from the lateral walls 22 at the first open end 26, as well.

Connector passages 32 are formed through the lateral walls 22. As shown in FIG. 1, the connector passages 32 are formed through a general middle section of the lateral walls 22. Optionally, the connector passages 32 may be formed through other portions of the lateral walls 22. Additionally, more than one connector passage 32 may be formed in each lateral wall 22. The connector passages 32 are formed to receive and retain a connector, such as wiring connector 34. The wiring connector 34 may be a three, four, or five wire connector, such as are known in the art. Additionally, the connector passages 32 may be formed to receive and retain various types of connectors, such as power connectors, communication connectors, and the like.

The end closure 16 includes a bottom wall 36 integrally formed with an upright wall 38 having lateral tabs 40 extending outwardly therefrom. The upright wall 38 also includes a ground screw passage 42 and knockout sections 44 that are adapted to attach conduit adapters (not shown), e.g., ½" or ¾" conduit adapters, to the modular distribution system 10. The bottom wall 36 includes fastener passages 46 formed to receive and retain a fastener, such as a screw, that is used to securely fasten the end closure 16 (and therefore the system 10) to a floor base (not shown).

The end closure 16 is configured to be fastened to either end 26 or 28 of the main body 14. In order to fasten the end closure 16 to an end 26 or 28 of the main body, the end closure 16 is slid into an end, such as end 26, of the main body 14. As the end closure 16 is slid into the main body 14, the lateral tabs 40 are slid into the interior of the main body 14, such that the lateral walls 22 of the main body 14 are positioned on the outside of the lateral tabs 40. Once fastener passages 48 of the lateral tabs 40 are aligned with fastener passages 50 of the lateral walls 22, a fastener, such as a screw 52, may be inserted through the passage defined by the aligned fastener passages 48 and 50 to secure the end closure 16 to the main body 14. The end closure 16 may be removed from the main body 14 (e.g., through the use of a screwdriver) in order to change the configuration of the system 10. That is, the end closure 16 may be removed in order to allow another main body to be attached to the main body 14. An end closure 16 may then be attached to the other main body. Optionally, the end closure 16 and the main body 14 may include latches or other features that allow the end closure 16 to be snapably, latchably, or otherwise removably retained by the main body 14.

The cover 18 includes fastener through-holes 54 positioned proximate the corners of the cover 18. The through-holes 54 are formed at positions that align with through-holes 56 formed on the upper ledges 24 of the main body 14. The cover 18 is positioned over the main body 14 such that edges of a lower surface 58 of the cover 18 overlay the ledges 24. Once the through-holes 54 of the cover 18 are aligned with the through-holes 56 of the ledges 24, screws 60 may be positioned through the passages defined by the alignment of the through-holes 54 and 56 to securely attach the cover 18 to the main body 14.

The cover 18 may alternatively include knockout sections (not shown) for connecting the module 12 to another distribution assembly, such as a preset or afterset housing, such as disclosed in U.S. Pat. No. 6,316,725, entitled "Housings for Underfloor Raceways," which is hereby incorporated by reference in its entirety. Optionally, the cover 18 may include an opening (not shown) that is configured to receive and retain an activation assembly, such as a flush mount duplex electrical outlet.

In order to secure the module 12 to the module 12', the second open end 28 of the module 12 is positioned to engage the first open end 26' of the module 12'. The securing tabs 30 of the module 12 are positioned over the ends of the lateral walls 14' of the module 12' so that fastener through-holes 62 formed through the tabs 30 are aligned with through-holes 64' formed through ends of the lateral walls 14' of the module 12'. Once the through-holes 62 and 64 are aligned, fasteners, such as screws 66, are positioned therethrough to secure the module 12 to the module 12'.

While the system 10 is shown such that the second end 28 of the module 12 is secured to the first end 26' of the module 12', the first end 26 of the module 12 may be secured to the second end 28' of the module 12'. Also, the module 10 may be defined by only one of the modules 12 or 12' having an end closure 16 mounted on each end 26 and 28, or 26' and 28'. Also, instead of an end closure 16 being positioned on the first end 26 of the module 12, another module may be secured to the first end 26, and so on. The same holds true for the second end 28' of the module 12'.

Overall, the system 10 is adaptable and may be reconfigured depending on the application or power and communications requirements of a system that is operatively connected to the system 10. The system 10 may be changed repeatedly to add or subtract modules. While the modules 12 and 12' are shown to be fastened together through screws, the modules 12 and 12' may instead include latching, hooking, locking, or otherwise securing members that allow the modules 12 and 12' to be snapably, latchably, or otherwise removably secured to one another and various other components.

Figure 2:
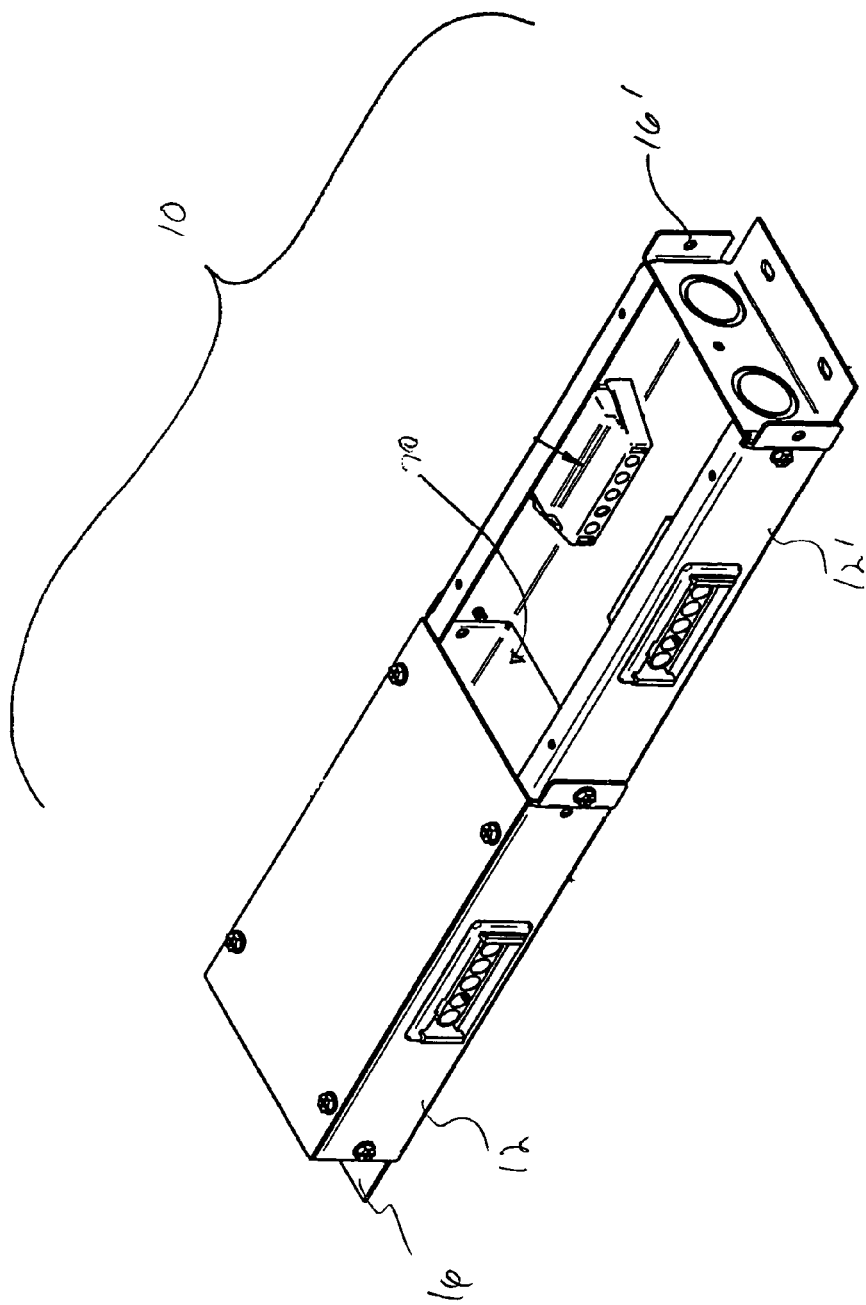
FIG. 2 illustrates an isometric view of a modular distribution system according to an embodiment of the present invention.

FIG. 2 illustrates an isometric view of the modular distribution system 10. As shown in FIG. 2, the module 12 is secured to the module 12'. An interior passage 70 is defined therebetween so that wiring may be passed from module to module 12'. As discussed above, more modules may be added to the system 10. For example, the end closures 16 and 16' may be removed so that additional modules may be mounted to the modules 12 and 12'.

Embodiments of the present invention provide a method of forming a variety of systems 10 through the use of three basic component parts, i.e., the main body 14, the end closure 16, and the cover 18. Each component part is uniformly manufactured. For example, each main body 14 is the same. Similarly, each end closure 16 is the same, and each cover 18 is the same. A plurality of these three basic components may then be used to construct a plurality of distribution systems (e.g., distribution systems of various lengths).

Figure 4:
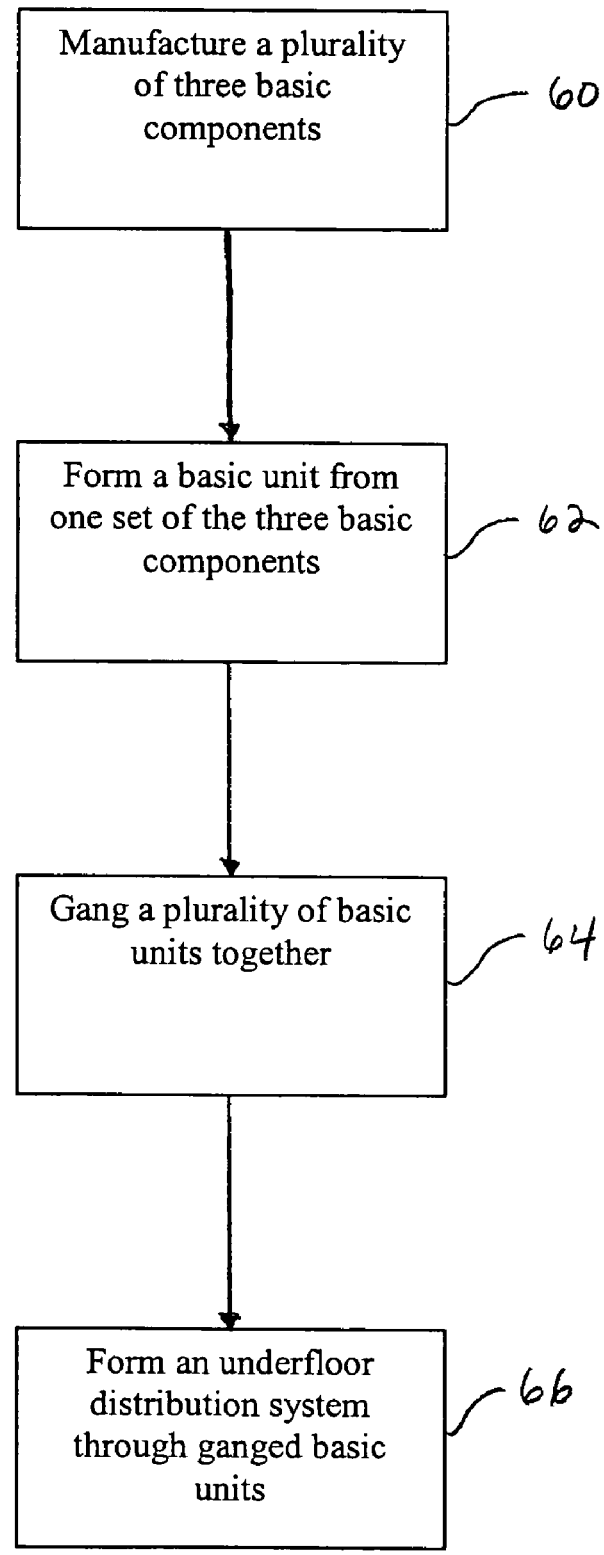
FIG. 4 illustrates a flow chart of a method of constructing ductwork for an underfloor distribution system, according to an embodiment of the present invention.

FIG. 4 illustrates a flow chart of a method of constructing ductwork for an underfloor distribution system, according to an embodiment of the present invention. At 60, a plurality of three basic components are manufactured. The three basic components may be the main body 14, the end closure 16 and the cover 18 discussed above. Each basic component may be formed using a single dye, mold, cast, and the like. Thus, the method efficiently manufactures the basic components using minimum tooling.

At 62, a basic unit is formed from one set of three basic components. For example, one basic unit, such as a module 12, may be formed from one main body 12, one end closure 16 and one cover 18. Once a plurality of basic units are formed, the plurality of basic units are ganged together at 64. An underfloor distribution system is formed through ganged basic units at 66.

Optionally, variations of the basic components may be manufactured to offer additional functionality. For example, two different main bodies, one having one type of connector passage 32, while another having another type of connector passage 32, may be manufactured. Similarly, one main body 14 may include one set of connector passages 32 while another may include multiple sets of connector passages 32. Further, different covers may be manufactured having different configurations and passages. Alternatively, the components may be modified after the basic components are formed. For example, additional connector passages may be formed through the main body 12 after the basic main body has been formed. Overall, the basic shapes and sizes of the components remains the same, thereby increasing the efficiency of the manufacturing process. Thus, with three basic components, a wide variety of underfloor distribution systems may be constructed and continually adapted to meet the needs of particular electrical and/or communications systems that are operatively connected to the systems.

Figure 3:
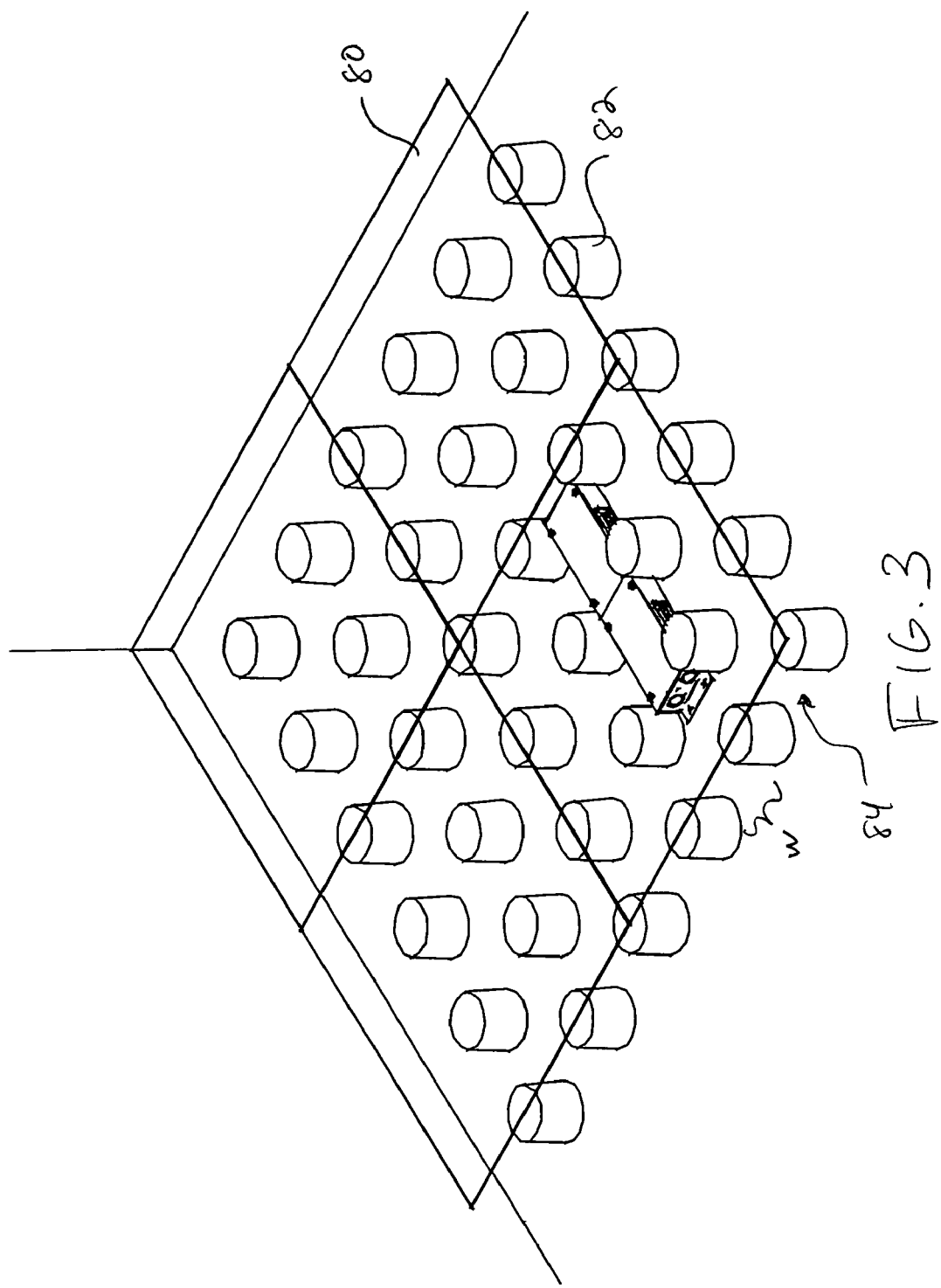
FIG. 3 illustrates an isometric view of a modular distribution system positioned underneath a raised floor according to an embodiment of the present invention.

FIG. 3 illustrates an isometric view of the modular distribution system 10 positioned underneath a raised floor 80. The raised floor 80 is supported by a series of pedestals 82 that are, in turn, supported by a floor base 84 (such as a concrete floor). The width (W) between pedestals 82 is wider than the width of the modular distribution system 10. Thus, the modular distribution system 10 may be positioned underneath the raised floor 80 between the pedestals 82. As such, electrical wiring, communication cables, and the like, may be routed underneath the raised floor 80 by way of the modular distribution system 10.

Thus, embodiments of the present invention provide a modular distribution system that is efficiently manufactured and adaptable to form various configurations.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An underfloor distribution system adapted to include a plurality of interchangeable modules having interior compartments that receive and retain power and communication wiring, said system comprising:

a first module configured to be positioned underneath a floor, said first module comprising a main body securely retaining at least one of a wiring connector, a power receptacle, and a communication interface; an end closure; and a cover, wherein said end closure and said cover are removably secured to said main body defining an interior compartment configured to receive and retain power and communication wiring, and wherein said first module is adapted to be removably mounted to a second module wherein said underfloor distribution system is secured to a concrete base that supports rows of pedestals that support a raised floor, wherein said underfloor distribution system is positioned below said raised floor between at least two rows of said pedestals.

2. The underfloor distribution system of claim 1, further comprising additional modules removably secured to one another.

3. The underfloor distribution system of claim 1, wherein a plurality of said main bodies, end covers and covers are configured to form a variety of underfloor distribution systems.

4. The underfloor distribution system of claim 1, wherein said end cover comprises conduit adapter knockouts.

5. The underfloor distribution system of claim 1, wherein said cover comprises at least one opening for receiving and retaining an activation assembly.

6. A network of housings for an underfloor distribution system, wherein said housings are configured to house at least one of power and communication wiring and cabling, said network comprising:

a plurality of interchangeable modules configured to be positioned underneath a floor, wherein each of said plurality of interchangeable modules comprises a main body, an end closure, a cover removably secured to said main body, and a connector passage that is adapted to securely retain at least one of a wiring connector, a power receptacle, and a communication interface, wherein each of said plurality of interchangeable modules are removably ganged to another of said plurality of interchangeable modules wherein said modules are supported by a concrete base that also supports rows of pedestals that support a raised floor, wherein said modules are positioned below said raised floor between at least two rows of said pedestals.

7. The network of claim 6, wherein a size of said network is adapted to be changed.

8. The network of claim 7, wherein said network consists essentially of a plurality of said main bodies, end closures and said covers.

9. The network of claim 6, wherein a plurality of modules are configured to interchangeably form and re-form a variety of networks.

10. The network of claim 6, wherein said end cover comprises conduit adapter knockouts.

11. The network of claim 6, wherein said cover comprises at least one opening for receiving and retaining an activation assembly.

12. A method of constructing ductwork for an underfloor distribution system, comprising:

manufacturing a plurality of sets of three basic components;

forming a basic unit from one set of said three basic components;

securely retaining at least one of a wiring connector, a power receptacle, and a communication interface within said basic unit;

ganging a plurality of basic units together; and forming an underfloor distribution system through said ganging the plurality of basic units together underneath a floor.

13. The method of claim 12, wherein the three basic components consist essentially of a main body, a cover assembly, and an end cover.

14. The method of claim 13, wherein basic unit comprises the three basic components removably connected to one another.

15. The method of claim 12, wherein said forming further comprises interchangeably connecting the plurality of basic units together to form a plurality of different configurations.

* * * * *